Patented Feb. 5, 1929.

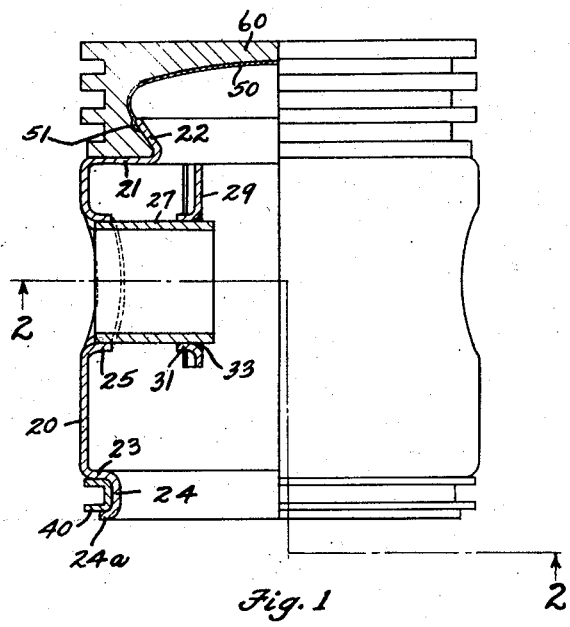
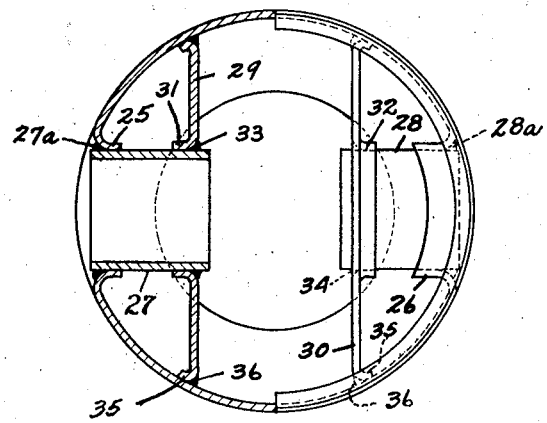

1,701,392

UNITED STATES PATENT OFFICE.

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE.

COMPOSITE PISTON.

Application filed February 19, 1926. Serial No. 89,361.

This invention relates to pistons for internal combustion engines and particularly to composite pistons having the skirt and the head constructed of different metals.

The objects of the invention are to provide certain improvements in the construction of a composite piston and in the method of manufacture thereof in order to reduce the cost of manufacture.

Further objects and advantages of the present invention will be apparent from the following description, reference being had to the accompanying drawings, wherein a preferred form of embodiment of the present invention is clearly shown.

In the drawings:

Fig. 1 is a view partly in longitudinal section and partly in side elevation showing a piston constructed in accordance with the present invention.

Fig. 2 is a sectional view on the line 2—2—2 of Fig. 1.

The skirt 20 is made preferably from high carbon sheet steel which is blanked out, rolled into cylindrical shape and welded to provide a cylindrical body having adjacent one end a flat circular flange 21 which merges into a conical outwardly flaring flange 22. Adjacent the other end of the skirt there is provided an inwardly extending flat circular flange 23 which merges into a cylindrical flange 24. The skirt also includes two diametrically opposite aligned apertures which are defined by flanges 25 and 26 which may be termed "piston pin bearing bosses". These apertured bosses receive, respectively, piston pin bearings 27 and 28 which are welded to the bosses 27ᵃ and 28ᵃ respectively. In order to stiffen the skirt and maintain the bearings 27 and 28 in alignment, there are provided two bridging plates 29 and 30 which are located in parallelism within the skirt 20 and in such manner that their central apertures which are defined by flanges 31 and 32 respectively, will be located in alignment with the flanges 25 and 26 of the skirt. These flanges 31 and 32 receive the bearings 27 and 28 respectively and are joined to the bearings by welding at 33 and 34 respectively. The plates 29 and 30 are provided with flanges 35 which are joined to the wall of the skirt 20 by welding at 36.

The shoulder provided by the flanges 23 and 24 of the skirt 20 receives an annularly grooved ring 40 which is secured to the skirt by flaring the lower edge of the flange 24 as indicated at 24ᵃ. The grooved ring 40 receives a piston ring which operates particularly to scrape oil from the cylinder wall.

A metal cap 50 is attached to the flange 22 by spinning the edge 51 of the cap against the outer surface of the flange. The structure thus far described is placed in a suitable mold and a piston head 60 is united with it by casting process. The cap 50 serves to define the inner wall of the head and therefore avoids the use of a core in the casting process. As described and claimed in my copending application, Serial No. 89,360, filed Feb. 19, 1926, the angle between the flanges 21 and 22 is such that the joints between the head and the skirt will remain tight throughout the working range of engine temperatures.

While the form of embodiment of the present invention as herein disclosed, constitutes a preferred form, it is to be understood that other forms might be adopted, all coming within the scope of the claims which follow.

What is claimed is as follows:

1. A composite piston comprising a cast metal piston head; a piston skirt of sheet metal secured to said head, and including flanged apertures in diametrically opposite portions thereof; a pair of braces, parallel and equidistant from the axis of the skirt, having their ends secured to the inner wall of said skirt independently of the head and each provided with flanged apertures in alignment with the flanged apertures in the skirt; and bearing sleeves supported by and secured in the apertures of the braces and their respective skirt apertures.

2. A composite piston comprising a sheet metal skirt, a cast metal head secured thereto, piston pin bearing supports on said skirt at opposite sides thereof, and bracing means providing additional piston pin bearing supports axially alined with said first-mentioned supports, said bracing means connected to and supported wholly by said skirt, the points of connection of said bracing means to said skirt being at points circumferentially remote from the first-mentioned supports.

3. Structure as set forth in claim 2, said bracing means including two substantially parallel plates having their ends abutting the walls of the piston skirt and secured thereto.

4. A composite piston structure comprising a sheet metal skirt having annular flanges at its lower edge and a ring engaging said flanges and retained thereby, said ring having an annular groove opening exteriorly to receive an oil-scraping piston ring.

In testimony whereof I affix my signature.

CHARLES R. SHORT.